US009228494B2

United States Patent
Facchinetti et al.

(10) Patent No.: US 9,228,494 B2
(45) Date of Patent: Jan. 5, 2016

(54) HYBRID CYCLE SOFC-INVERTED GAS TURBINE WITH CO2 SEPARATION

(75) Inventors: Emanuele Facchinetti, Ecublens (CH); Daniel Favrat, Epalinges (CH); François Marechal, Orbe (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 1006 days.

(21) Appl. No.: 13/382,033

(22) PCT Filed: Jun. 9, 2010

(86) PCT No.: PCT/IB2010/052558
§ 371 (c)(1), (2), (4) Date: Jan. 26, 2012

(87) PCT Pub. No.: WO2011/001311
PCT Pub. Date: Jan. 6, 2011

(65) Prior Publication Data
US 2012/0117979 A1    May 17, 2012

(30) Foreign Application Priority Data
Jul. 3, 2009   (CH) ....................................... 1034/09

(51) Int. Cl.
*H01M 8/02*      (2006.01)
*H01M 8/04*      (2006.01)
(Continued)

(52) U.S. Cl.
CPC ................. *F02C 3/205* (2013.01); *F01K 23/02* (2013.01); *F02C 3/28* (2013.01); *F02C 6/006* (2013.01);
(Continued)

(58) Field of Classification Search
CPC .......... H01M 8/04014; H01M 8/0411; H01M 8/04141; H01M 8/04164; H01M 8/04171; H01M 8/0662; H01M 8/14; H01M 8/2495
See application file for complete search history.

(56) References Cited

U.S. PATENT DOCUMENTS

2002/0142208 A1* 10/2002 Keefer ................. B01D 53/047 429/411
2003/0143448 A1*  7/2003 Keefer ........................... 429/26
(Continued)

FOREIGN PATENT DOCUMENTS

| EP | 1 564 830 | 8/2005 |
| JP | 2001-043875 | 2/2001 |

(Continued)

OTHER PUBLICATIONS

International Search Report for PCT/IB2010/052558, mailed Jun. 30, 2011.
Written Opinion of the International Searching Authority for PCT/IB2010/052558, mailed Jun. 30, 2011.
Swiss Search Report for CH No. 01034/09, dated Aug. 27, 2009.
(Continued)

*Primary Examiner* — Kenneth Douyette
(74) *Attorney, Agent, or Firm* — Nixon & Vanderhye P.C.

(57) ABSTRACT

A new gas turbine-fuel cell Hybrid Cycle is proposed. The fuel cell advantageously operates close or under atmospheric pressure and is fully integrated with the gas turbine that is based on an Inverted Brayton-Joule Cycle. The idea of the invention is to capitalize on the intrinsic oxygen-nitrogen separation characteristic of the fuel cell electrolyte by sending to the Inverted Brayton-Joule Cycle only the anodic flow, which is the one free of nitrogen. In this way the flow that expands in the turbine consists only in steam and carbon dioxide. After the expansion the steam can be easily condensed, separated and pumped up. Therefore the compressor has mainly only to compress the separated carbon dioxide. This effect generates a substantial advantage in term of efficiency and enables separating the carbon dioxide. The new proposed Hybrid Cycle enables to: substantially increase the system efficiency compared to the known gas turbine-fuel cell Hybrid Cycle, maintain the fuel cell operating under or close to atmospheric pressure and separate the carbon dioxide.

20 Claims, 5 Drawing Sheets

Schematic drawing of a fuel cell-gas turbine hybrid cycle in accordance with the Extension 2

(51) Int. Cl.
*H01M 8/22* (2006.01)
*H01M 16/00* (2006.01)
*F02C 3/20* (2006.01)
*F01K 23/02* (2006.01)
*F02C 3/28* (2006.01)
*F02C 6/00* (2006.01)
*H01M 8/06* (2006.01)
*H01M 8/12* (2006.01)

(52) U.S. Cl.
CPC ........ *H01M 8/04111* (2013.01); *H01M 8/0612* (2013.01); *H01M 8/0668* (2013.01); *H01M 2008/1293* (2013.01); *H01M 2250/407* (2013.01); *Y02E 20/14* (2013.01); *Y02E 20/16* (2013.01); *Y02E 60/50* (2013.01); *Y02E 60/525* (2013.01); *Y02E 60/563* (2013.01)

(56) References Cited

U.S. PATENT DOCUMENTS

| | | | |
|---|---|---|---|
| 2005/0048345 A1* | 3/2005 | Meacham | C01B 3/366 429/410 |
| 2007/0099038 A1* | 5/2007 | Galloway | C10J 3/20 48/197 R |
| 2007/0163822 A1 | 7/2007 | Grieve | |
| 2008/0187789 A1 | 8/2008 | Ghezel-Ayagh | |

FOREIGN PATENT DOCUMENTS

| | | |
|---|---|---|
| WO | WO 01/95409 | 12/2001 |
| WO | WO 02/078109 | 10/2002 |

OTHER PUBLICATIONS

Tsujikawa, Y. et al., "Part-Load Performance of MCFC/APT Hybrid Power System", Proceedings of The ASME Turbo Expot 2008, (Jan. 1, 2008), pp. 349-355.

\* cited by examiner

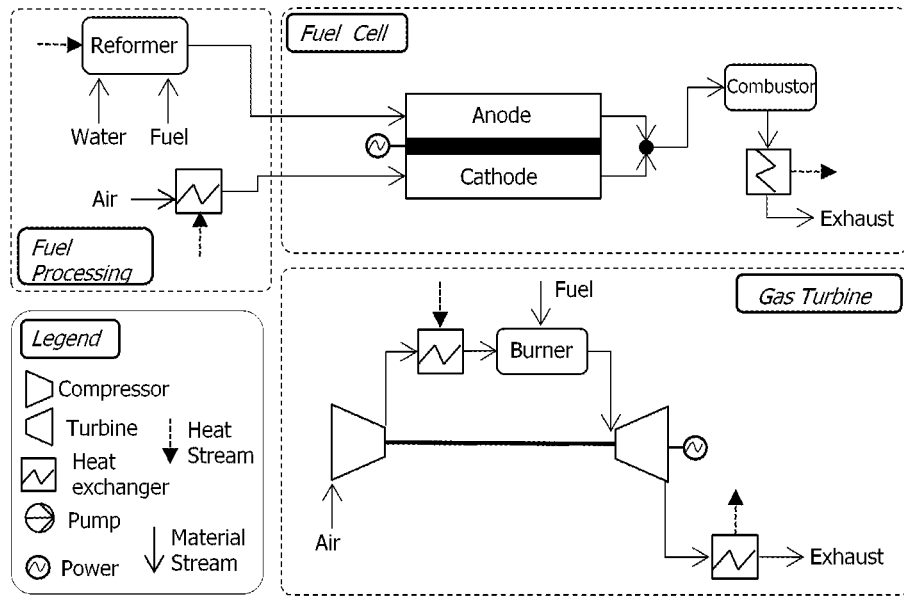
Figure 1: Hybrid Cycle integrated by heat exchanger
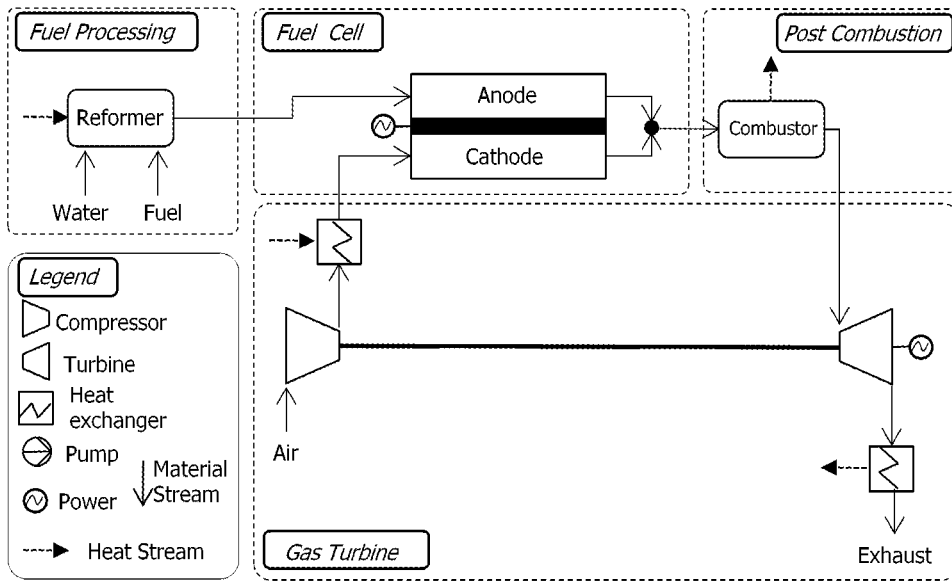
Figure 2: Directly coupled Hybrid Cycle

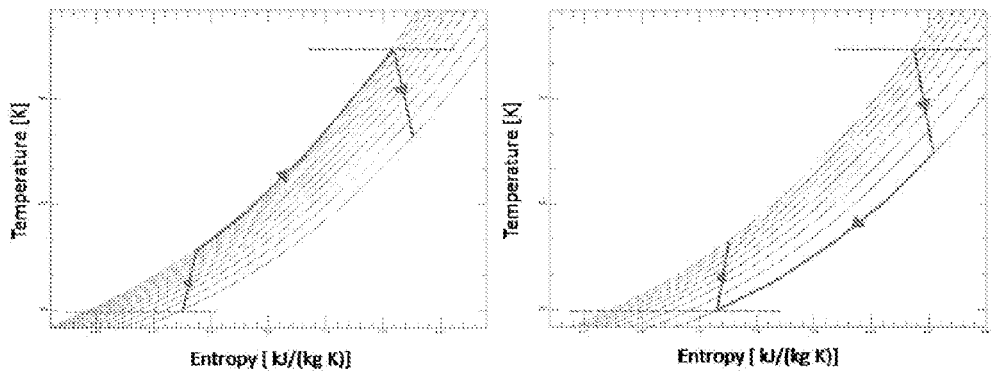
Figure 3: Representations in a Temperature-Entropy diagram of a traditional (left) and an Inverted (right) Brayton-Joule Cycle
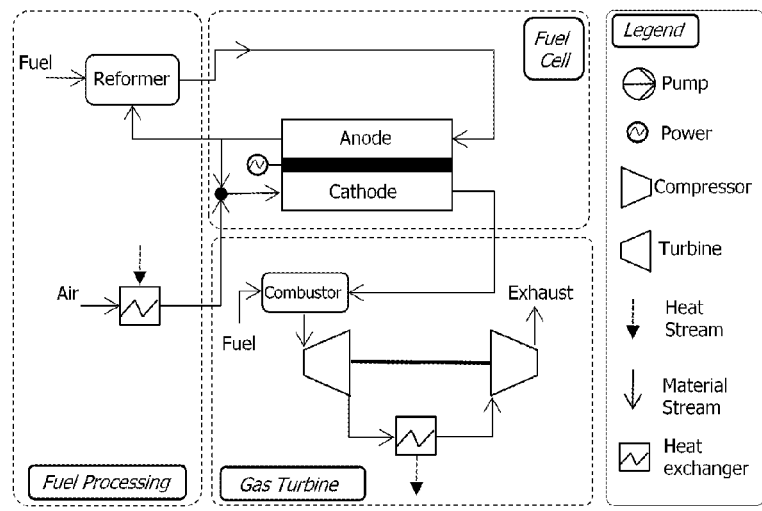
Figure 4: Hybrid Cycle, based on the Inverted Brayton-Joule Cycle, proposed by Tsujikawa

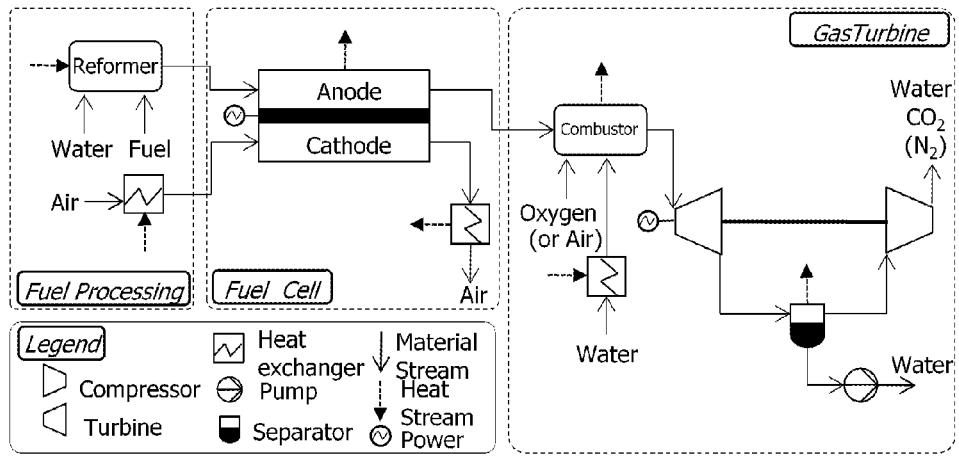
Figure 5: Schematic drawing of a fuel cell-gas turbine hybrid cycle in accordance with the invention
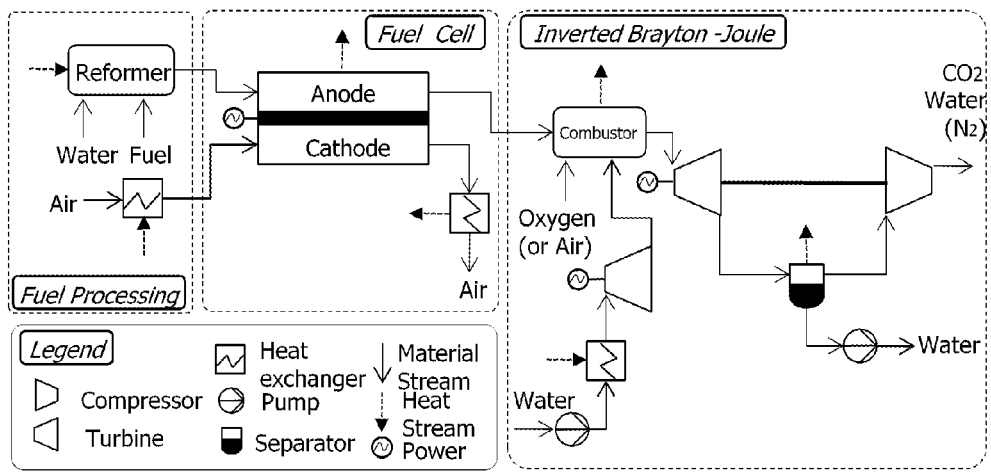
Figure 6: Schematic drawing of a fuel cell-gas turbine hybrid cycle in accordance with the Extension 1

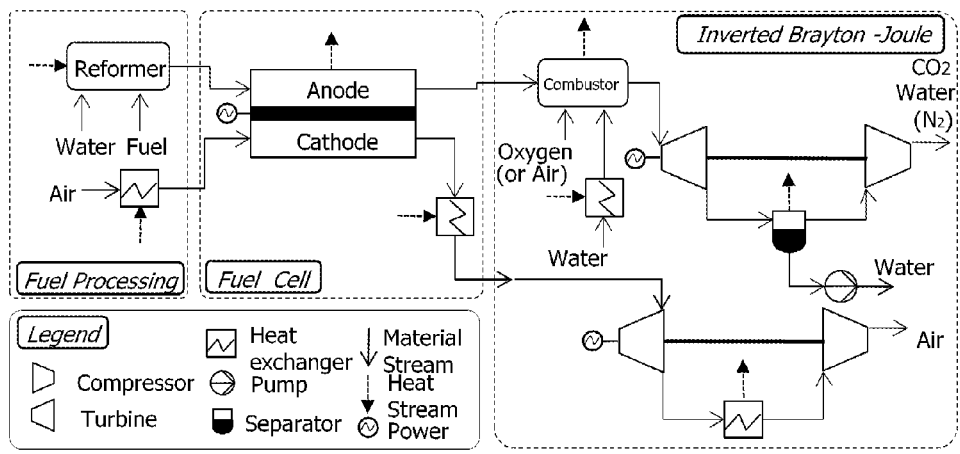
Figure 7: Schematic drawing of a fuel cell-gas turbine hybrid cycle in accordance with the Extension 2
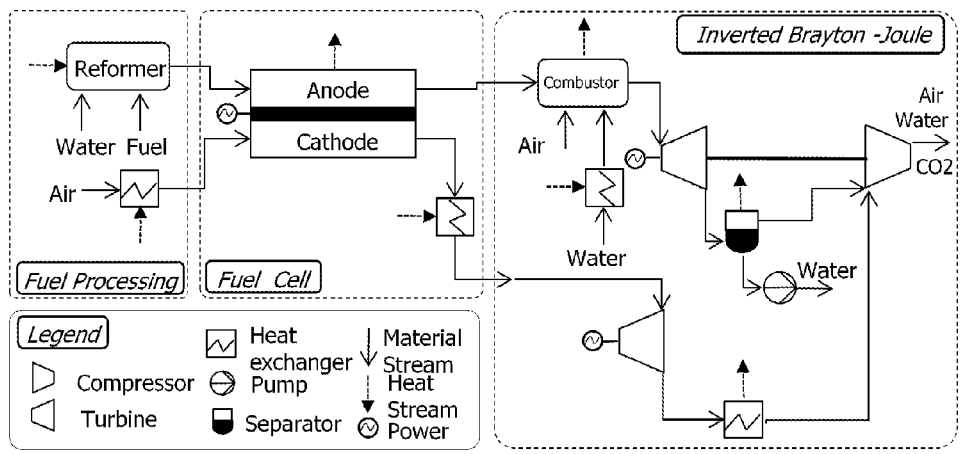
Figure 8: Schematic drawing of a fuel cell-gas turbine hybrid cycle in accordance with the Extension 3

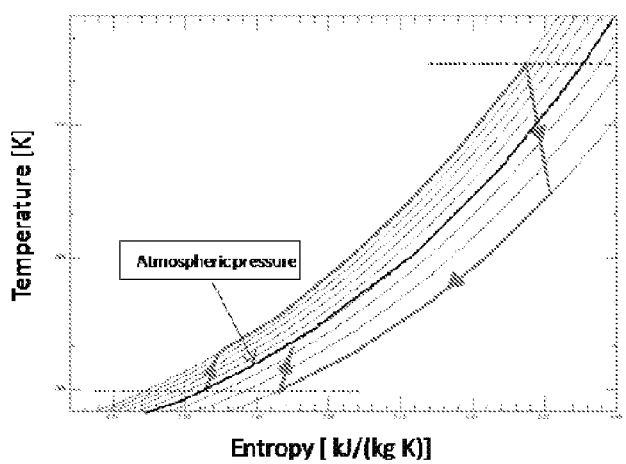
*Figure 9: Representations in a Temperature-Entropy diagram of a Brayton-Joule Cycle crossing the atmospheric pressure level*

HYBRID CYCLE SOFC-INVERTED GAS TURBINE WITH CO2 SEPARATION

This application is the U.S. national phase of International Application No. PCT/IB2010/052558, filed 9 Jun. 2010, which designated the U.S. and claims priority to CH Application No. 01034/09, filed 3 Jul. 2009, the entire contents of each of which are hereby incorporated by reference.

FIELD OF INVENTION

The present invention relates to power generation and cogeneration of heat and power.

STATE OF THE ART

To face global warming and growing energy problems, concerted efforts are required. The rising demand for electrical power and the necessity to decrease fossil fuel consumption push for development of new power generating systems, with higher efficiencies and reduced environmental impacts.

An attractive way to reach a more rational energy conversion of fossil or bio fuels is the decentralized power generation and cogeneration of heat and power. Among major weaknesses of existing small systems at the building level, consisting mainly of internal combustion or Stirling engines, are low electrical efficiency, high maintenance costs, together with noise and vibration. Recently introduced mini gas turbines in the range of 40 to 120 kWel reduce the three latter problems but at an even lower efficiency. Moreover they are not available in the smaller power range typical of many multi-family houses. Molten Carbon Fuel Cells (MCFC) and Solid Oxide Fuel Cells (SOFC) are emerging as major candidates to alleviate all the above mentioned drawbacks.

However the fuel cannot be entirely converted electrochemically in the fuel cell alone and part of it is combusted downstream of the fuel cell with low energy efficiency. One existing approach suggests to further improve the electrical efficiency by combining the fuel cell with a gas turbine in a hybrid system.

Both MCFC and SOFC are suitable partners for gas turbines, even though SOFC are considered to be the best candidates for these applications because of their higher working temperature (around 950° C.). The first applications and simulations show a potential of efficiency of the order of 60% or higher which would make decentralized generation as or more efficient than large combined cycle power plants.

In spite of the advantages of this hybrid technology, many technical barriers have to be overcome to develop a highly efficient system. Fuel cell and gas turbines are rather different power generation systems: the operational mode of a standalone gas turbine is dynamic, whereas the fuel cell is static. The matching between the two systems is crucial. It is essential to guarantee a safe and stable operation point for the fuel cell, to avoid structural or physical stack damages. Fuel cell pressurization represents one of the greatest challenges.

Considering the SOFC, two different classes are nowadays available: the tubular and planar geometry. Planar geometry is today the most efficient and compact of the two and object of much research, however it is the more problematic under pressurized conditions.

The Hybrid Cycle can be classified into two classes with respect to the integration level between the gas turbine and the fuel cell [1].

The first and simplest Hybrid Cycle class consists in maintaining the two systems separate and uses a heat exchanger as interface. An example is shown in FIG. 1. In this case the fuel cell exhaust heats the compressed air in the micro gas turbine recuperator whereas anode and cathode gases are preheated with the gas turbine exhaust gas and heat released from combustion of residual fuel contained in the fuel cell exhaust gas. This solution facilitates control of the entire system, and can allow the SOFC to work at atmospheric pressure. Inevitably, the drawbacks are high energy losses and therefore a low efficiency.

To increase the system efficiency it is necessary to fully integrate gas turbines and fuel cells. This is the direction taken in the second Hybrid Cycle class in which research efforts are more concentrated, and different design solutions have been developed. In the most common solution (FIG. 2) the compressor supplies compressed air at the fuel cell cathode. Usually, for planar geometry, the differential pressure between the cathode and anode is hard to maintain; therefore the whole fuel cell is working under the same pressure. For tubular geometry differential pressure between the cathode and anode is easier to maintain. In each case pressurizing the fuel cells presents a challenge. After passing through the fuel cells, the anodic and cathodic flows are mixed and the mixture goes into a combustor into which the unconsumed fuel is fully oxidized. Following this, the hot gases including both the anodic and cathodic flows expand in the turbine and are ejected as waste gases. Usually air factors (ratio between real and stoichiometric air flow) are high because the gas flows are also there to take the extra heat due to irreversibility in the fuel cell, so that the produced steam is rather diluted in the exhaust and therefore difficult to condense.

The world's first SOFC/GT hybrid system, including a pressurized tubular SOFC module integrated with a micro turbine/generator, was delivered to Southern California Edison for operation at the Irvine's National Fuel Cell Research Center. This system was the first-ever demonstration of the SOFC/gas turbine hybrid concept and reached 53% electric efficiency for 220 kW [2].

Other experimental applications have been developed, but all are restricted to the tubular SOFC stacks. Only recently, Lim [3] operates for a few hours a pressurized Hybrid Cycle, according with the FIG. 3, with a 25 kW micro gas turbine and a 5 kW class planar SOFC, designed to work under atmospheric conditions.

Many studies have assessed the feasibility and operating condition of a variety of integrated high efficiency design alternatives. Palsonn [4] showed the possibility to reach, also with a low pressure ratio (typical of small to medium size dynamic turbomachinery), more than 65% of efficiency. Massardo [5] analyzed pressurized and atmospheric systems with efficiency up to 75%.

Other approaches are related to the Hybrid System design with a thermo-economic analysis. Autissier [6] demonstrated the possibility to reach 70% efficiency for 6700 $/kW with a 50 kW pressurized system.

A different way to fully integrate a gas turbine with fuel cells is proposed by Tsujikawa [7, 8, 9]. He proposed a Hybrid Cycle with the fuel cell operating at atmospheric pressure and the gas turbine driven in an Inverted Brayton-Joule Cycle (FIG. 3).

The Inverted Brayton-Joule Cycle, which has been fully detailed by Wilson [10], is characterized by the expansion in the turbine before the compression. This technology is not in use today for power generation purposes due to the lower efficiency obtainable with respect to a traditional gas turbine because of the smaller power density. Inoue [11] and Tanaka [12] showed performance evaluations based on simulations and experimental measurements of a gas turbine based on Inverted Brayton-Joule Cycle.

The Tsujikawa system layout is shown in FIG. 4; he showed a 65% efficiency reachable either with a SOFC or a MCFC. It is important to stress that as in the most common pressurized fully integrated system (FIG. 1), in the Tsujikawa system the anodic and cathodic flows are mixed and the mixture goes then into a combustor into which the unconsumed fuel is fully oxidized. Following this, the hot gases including both the anodic and cathodic flows expand in the turbine. In the Tsujikawa configuration, waste gases are ejected after being cooled and recompressed to atmospheric pressure with the compressor.

Summarizing, the research in the last years fully demonstrates the potential of the fuel cell-gas turbine hybrid system. However limits of this technology are also clear: to reach a high efficiency it is necessary to fully integrate the two power generation systems which is difficult as operating the fuel cell under pressurized conditions creates new technical difficulties.

The Inverted Brayton-Joule based proposals partially solve the problems. In fact with these systems it is possible to operate the fuel cell under atmospheric conditions and to fully integrate the gas turbine. However the limit of these solutions is a lower system efficiency with regard to a pressurized system.

INVENTION DESCRIPTION

The present invention offers several advantages with respect to the state of the art, in particular: the system efficiency is substantially increased, the fuel cell operates close or under atmospheric conditions and the carbon dioxide is separated. One embodiment of the invention is presented in FIG. 5.

In Brayton-Joule Cycles (traditional or inverted), the compressor uses a large part of the turbine power (typically over the 60%). The new proposal Hybrid Cycle, based on a fuel cell operating at or close to atmospheric pressure coupled with a gas turbine driven in an Inverted Brayton-Joule Cycle, enables to reduce substantially the turbine power used by the compressor.

The idea is to capitalize on the intrinsic oxygen-nitrogen separation characteristic of the fuel cell electrolyte by sending to the Inverted Brayton-Joule Cycle only the flow from the anode, which is free of nitrogen. After the combustion, if the remaining fuel (not utilized in the fuel cell, typically 15 to 25%) is oxidized using pure oxygen, the anodic flow consists only of carbon dioxide and water. The water can easily be condensed and separated in the cooling process between the turbine and the compressor. The latter mainly compresses carbon dioxide whereas the water is pumped up separately. As gas compression is much more demanding in terms of mechanic power than liquid pumping, the reduced gas flow leads to significant savings of power with respect to traditional systems.

To benefit as much as possible from this gain, supplementary water is preferably injected in the anodic flow either in the combustor and/or in the fuel processing unit and/or elsewhere before the turbine inlet. As a consequence, the anodic flow steam injection rate is optimized and usually increased compared to the standard hybrid fuel cell-gas turbine system.

An additional advantage of the present invention is that the carbon dioxide can be separated for other uses of storage and can be compressed to a compatible state for transportation and sequestration.

The advantages of the power savings and the carbon dioxide separation, although reduced, are maintained in case that the combustion is done with air instead of pure oxygen, as combustion concerns only a small part of the total fuel converted in the system.

All the heat exchangers required by the system can be organized in one or more heat exchange networks. The energy recovered by cooling down the cathodic flow, and/or the fuel cell, and/or the combustor, and/or the flow coming out the turbine before the compressor unit (compressor and pump), and/or the exhausted flows, and/or other units, and/or other complementary cycles, can be used to supply heat to the fuel processing unit, and/or to produce steam injected in the combustor, and/or to gasification units and/or to other complementary cycles (e.g. Rankine Cycle, ORC-ORC cycle), and/or for cogeneration purposes.

Summarizing, the Main Advantages Related to the Present Invention are

Increased system efficiency, due to the fact that the steam expanded in the turbine is then condensed and recompressed by a pump and not by the compressor. Therefore the compressor's power is substantially decreased whereas the turbine's power remains constant.

The system enables carbon dioxide separation.

Possibility to operate the Fuel Cell at or close to atmospheric pressure.

Higher combustion efficiency due to optimization of the Fuel—Oxygen ratio.

Larger volume flow in small to medium size dynamic compressor and turbine that make easier high efficiency turbomachinery design.

Hereafter are presented some extensions at the above presented innovation.

Extension 1

A system according with the above described invention in which the supplementary steam injected in the anodic flow is generated at high pressure and is expanded in a turbine before to be injected in the anodic flow (FIG. 6). The steam turbine represents an additional electric output.

Extension 2

A system according with the above described invention in which the flow coming out the fuel cell cathode is driven in a gas turbine based on an Inverted Brayton-Joule Cycle (FIG. 7). The cathodic flow coming out the fuel cell cathode can exchange heat with the heat exchanger network before to expand in a turbine below the atmospheric pressure, then is cooled down and recompressed to the atmospheric pressure. The gas turbine represents an additional electric output.

The Extension 2 can be combined with the Extension 1.

Extension 3

A system according with the above described invention in which the cathodic flow coming out the fuel cell is expanded below the atmospheric pressure in a turbine, than it is cooled down and is mixed up with the anodic flow coming out the separator before the compressor inlet. The compressor compresses the mixture between cathodic and the anodic flow up to the atmospheric pressure. Both the anodic and the cathodic flows are driven into two gas turbines, based on an Inverted Brayton-Joule Cycle, that share the same compressor (FIG. 8).

The compressor can be driven by the anodic turbine and/or by the cathodic turbine and/or by an electric motor.

The Extension 3 can be combined with the Extension 1, 2.

Extension 4

By extension the present invention can also be applied to a concept combining traditional Brayton-Joule Cycle and Inverted Brayton-Joule Cycle. The advantage of reducing compression power is then reduced but still more advantageous than the traditional design. However this configuration can make easier the system start up.

The invention can be applied with advantage every time that in the gas turbine-fuel cell Hybrid Cycle there is one expansion before one compression. Therefore application of the discussed idea can be generalized also in the case in which the turbine expands from above atmospheric pressure (e.g. use of a pressurized fuel cell) or from below the atmospheric pressure.

In example FIG. 9 shows a cycle in which the turbine is expanding from above atmospheric pressure down to below atmospheric pressure. Also in this case the invention can be applied advantageously.

The Extension 4 can be combined with the Extension 1, 2, 3.

Extension 5

The present invention can be applied in a gas turbine-fuel cell hybrid cycle with any kind or size of Fuel Cell.

The Extension 5 can be combined with the Extension 1, 2, 3, 4.

Extension 6

The present invention can be applied independently to the class or size of the involved turbomachinery, including multi-stage compressions and expansions, intercooling between the compressions, re-heating between the expansions, monoshaft and/or multishaft configurations.

The Extension 6 can be combined with the Extension 1, 2, 3, 4, 5.

Extension 7

The present invention can be applied to convert any kind of fuel and can be integrated with any kind of fuel processing.

The Extension 7 can be combined with the Extension 1, 2, 3, 4, 5, 6.

Extension 8

The present invention can be applied to convert the syngas produced by any gasification process. In that case, the invention will allow for different integration with the gasification process:

By heat integration with the gasification process, the fuel pretreatment or the gas treatment
By the possible use in the gasification process of the gases processed in the invention
By the direct or indirect integration of the burner in the gasification process.

The Extension 8 can be combined with the Extension 1, 2, 3, 4, 5, 6, 7.

Extension 9

A system according with the above described invention in which the oxygen necessary to oxidize the amount of fuel unconverted in the fuel cell can be added in the anodic flow either in the combustion chamber and/or in the fuel processing and/or elsewhere before the combustion chamber.

The alternatives to separate pure oxygen from air include:
An oxygen separation membrane, in example to separate oxygen from the cathodic flow;
A fuel cell used in reverse mode;
Through water hydrolysis. The products of this process are oxygen and hydrogen. The hydrogen can be used as fuel for the fuel cell.

The Extension 9 can be combined with the Extension 1, 2, 3, 4, 5, 6, 7, 8.

REFERENCES

[1] Bohn, D., *Micro Gas Turbine and Fuel Cell—A Hybrid Energy Conversion System with High Potential*, RTO-EN-AVT-131, 2005.
[2] Vejo, S. L., *Tubular Solid Oxide Fuel Cell/Gas Turbine Hybrid Cycle Power Systems: Status*, Journal of Engineering for Gas Turbines and Power, vol. 124, 2002.
[3] Lym, T. H., *Operating characteristics of a 5 kW class anode-supported planar SOFC stack for a fuel cell/gas turbine hybrid system*, International Journal of Hydrogen Energy, vol. 33, Issue: 3, 2008.
[4] Palsson, J., *Combined solid oxide fuel cell and gas turbine systems for efficient power and heat generation*, Journal of Power Sources, vol. 86, Issue: 1-2, 2000.
[5] Massardo, A. F., *Internal reforming solid oxide fuel cell gas turbine combined cycles (IRSOFC-GT) Part A—Cell model and cycle thermodynamic analysis*, Journal of Engineering for Gas Turbines and Power—Transactions of the ASME, vol. 122, Issue: 1, 2003.
[6] Autissier, N., *Thermo-economic optimization of a solid oxide fuel cell, gas turbine hybrid system*, Journal of Fuel Cell Science and Technology, vol. 4, Issue: 2, 2007.
[7] Tsujikawa, Y., *Proposal of the Atmospheric Pressure Turbine (APT) and High Temperature Fuel Cell Hybrid System*, JSME International Journal Series B, vol. 47, 2004.
[8] Tsujikawa, Y., *Performance analysis of APT (atmospheric pressure turbine)-molten carbonate fuel cell hybrid system*, Proceedings of the ASME Turbo Expo 2006, Vol. 4, 2006.
[9] Tsujikawa, Y., *Part-Load performance of MCFC/APT Hybrid Power System*, Proceedings of the ASME Turbo Expo 2008, Vol. 7, 2008.
[10] Wilson, D. G., *The Design of High-Efficiency Turbomachinery and Gas Turbines*, MIT Press, 1993.
[11] Inoue, K., *Construction and performance evaluation of prototype atmospheric pressure turbine (APT)*, Proceedings of the ASME Turbo Expo 2006, Vol. 4, 2006.
[12] Tanaka, K., *The development of 50 kW output power atmospheric pressure turbine (APT)*, Proceedings of the ASME Turbo Expo 2007, Vol. 3, 2007.

The invention claimed is:
1. A hybrid power generation system comprising a fuel cell including an anode, a cathode, an anodic turbine, and an anodic fluid line,
wherein the anodic fluid line comprises:
said anode,
a combustor,
said anodic turbine,
a compressor downstream of said anodic turbine,
a separator located between said anodic turbine and said compressor, an anodic flow consisting only of carbon dioxide and water flowing from said anode through said combustor and said anodic turbine;

said system further comprising an Inverted Brayton cycle downstream of said anode, and a cathodic fluid line consisting of at least said cathode and a cathodic flow flowing to and from said cathode; and wherein said fluid lines are separated from each other such that a portion of the anodic line between said anode and said separator is free of nitrogen from the cathodic fluid line.

2. The system according to claim 1 wherein the anodic fluid line further comprises a water inlet.

3. The system according to claim 2 wherein said water inlet is located on said combustor.

4. The system according to claim 1 wherein the cathodic fluid line comprises a cathodic turbine.

5. The system according to claim 1 wherein the cathodic fluid line comprises a cathodic compressor.

6. The system according to claim 5 wherein the cathodic fluid line comprises a cathodic turbine, and wherein said cathodic compressor is located downstream of said cathodic turbine.

7. The system according to claim 1 wherein the anodic fluid line comprises an anodic compressor.

8. The system according to claim 7 wherein said anodic compressor is located downstream from the anodic turbine.

9. The system according to claim 1 wherein the anodic fluid line comprises steam condensing means adapted to condensate the steam downstream from the anodic turbine.

10. The system according to claim 9 wherein said fluid lines are separated from each other between said fuel cell and said steam condensing means.

11. The system according to claim 5 wherein said fluid lines are joined between said condensing means and said anodic compressor.

12. The system according to claim 10 wherein said fluid lines are joined between said condensing means and said cathodic compressor.

13. A method of generating power comprising selecting the system as defined in claim 1, and using the system such that the compressor and the turbine are operating on an Inverted Brayton Joule Cycle.

14. A method of generating power comprising selecting the system as defined in claim 1 wherein the compressor and the turbine are operating on a combination of Brayton-Joule Cycle and Inverted Brayton-Joule Cycle.

15. A method of generating power comprising selecting the system as defined in claim 1 and injecting water into the system.

16. A method of generating power comprising selecting the system as defined in claim 1, and separating carbon dioxide.

17. A method of generating power comprising selecting the system as defined in claim 1, and using syngas in the system.

18. A method of generating power comprising selecting the system as defined in claim 1, and producing syngas.

19. A method of generating power comprising selecting the system as defined in claim 1, and converting syngas by using the system.

20. A method of generating power comprising selecting the system as defined in claim 1, and using a gasification process in the system.

* * * * *

UNITED STATES PATENT AND TRADEMARK OFFICE
CERTIFICATE OF CORRECTION

Page 1 of 1

PATENT NO. : 9,228,494 B2
APPLICATION NO. : 13/382033
DATED : January 5, 2016
INVENTOR(S) : Emanuele Facchinetti, Daniel Favrat and François Marechal It is certified that error appears in the above-identified patent and that said Letters Patent is hereby corrected as shown below:

In the claims,

At column 7, lines 1-3 should read:

> an anodic flow flowing from said anode through said combustor and said anodic turbine, said anodic flow, after having crossed said combustor, consists only of carbon dioxide and water;

Signed and Sealed this
Twelfth Day of July, 2016

Michelle K. Lee
*Director of the United States Patent and Trademark Office*